United States Patent
Folliot et al.

(10) Patent No.: US 11,609,851 B2
(45) Date of Patent: Mar. 21, 2023

(54) DEVICE AND METHOD FOR ALLOCATING INTERMEDIATE DATA FROM AN ARTIFICIAL NEURAL NETWORK

(71) Applicants: STMicroelectronics (Rousset) SAS, Rousset (FR); STMicroelectronics S.r.l., Agrate Brianza (IT)

(72) Inventors: Laurent Folliot, Gourdon (FR); Emanuele Plebani, Sotto il Monte Giovanni XXIII (IT); Mirko Falchetto, Milan (IT)

(73) Assignees: STMicroelectronics S.r.l., Agrate Brianza (IT); STMicroelectronics (Rousset) SAS, Rousset (FR)

( * ) Notice: Subject to any disclaimer, the term of this patent is extended or adjusted under 35 U.S.C. 154(b) by 7 days.

(21) Appl. No.: 17/229,161

(22) Filed: Apr. 13, 2021

(65) Prior Publication Data
US 2021/0342265 A1 Nov. 4, 2021

(30) Foreign Application Priority Data
Apr. 30, 2020 (FR) ...................................... 2004337

(51) Int. Cl.
*G06F 12/06* (2006.01)
*G06N 3/04* (2023.01)

(52) U.S. Cl.
CPC ........... *G06F 12/0646* (2013.01); *G06N 3/04* (2013.01); *G06F 2212/1044* (2013.01)

(58) Field of Classification Search
CPC ............. G06F 12/0207; G06F 12/0284; G06F 12/0646; G06F 2212/1044; G06N 3/04
See application file for complete search history.

(56) References Cited

U.S. PATENT DOCUMENTS

2004/0158464 A1* 8/2004 Baker ................... G10L 15/083
704/231
2017/0161604 A1* 6/2017 Craddock ............ G06N 3/0454
(Continued)

FOREIGN PATENT DOCUMENTS

CN 110162338 A 8/2019
EP 3663987 A1 6/2020
(Continued)

OTHER PUBLICATIONS

Wikipedia, Stack (abstract data type), Apr. 27, 2020, available: https://web.archive.org/web/20200427214640/https://en.wikipedia.org/wiki/Stack_(abstract_data_type).*

*Primary Examiner* — Tracy A Warren
(74) *Attorney, Agent, or Firm* — Slater Matsil, LLP (57) ABSTRACT

According to one aspect, a method for determining, for a memory allocation, placements in a memory area of data blocks generated by a neural network, comprises a development of an initial sequence of placements of blocks, each placement being selected from several possible placements, the initial sequence being defined as a candidate sequence, a development of at least one modified sequence of placements from a replacement of a given placement of the initial sequence by a memorized unselected placement, and, if the planned size of the memory area obtained by this modified sequence is less than that of the memory area of the candidate sequence, then this modified sequence becomes the candidate sequence, the placements of the blocks for the allocation being those of the placement sequence defined as a candidate sequence once each modified sequence has been developed.

21 Claims, 7 Drawing Sheets

(56) References Cited

U.S. PATENT DOCUMENTS

| | | | |
|---|---|---|---|
| 2018/0088996 A1* | 3/2018 | Rossi | G06F 9/5016 |
| 2019/0147319 A1 | 5/2019 | Kim et al. | |
| 2019/0156185 A1* | 5/2019 | Li | G06N 3/082 |
| 2020/0183834 A1 | 6/2020 | Folliot et al. | |
| 2020/0257972 A1* | 8/2020 | Miniskar | G06N 3/04 |
| 2020/0302278 A1 | 9/2020 | Folliot et al. | |

FOREIGN PATENT DOCUMENTS

| | | |
|---|---|---|
| EP | 3712775 A1 | 9/2020 |
| WO | 2017095840 A1 | 6/2017 |
| WO | 2019031858 A1 | 2/2019 |

* cited by examiner

DEVICE AND METHOD FOR ALLOCATING INTERMEDIATE DATA FROM AN ARTIFICIAL NEURAL NETWORK

CROSS-REFERENCE TO RELATED APPLICATIONS

This application claims the benefit of French Application No. 2004337, filed on Apr. 30, 2020, which application is hereby incorporated herein by reference.

TECHNICAL FIELD

Embodiments and implementations relate to artificial neural network devices and methods, and more particularly to the allocation of memory during the execution of these neural networks.

BACKGROUND

Artificial neural networks generally comprise a succession of neuron layers.

Artificial neural networks take a data set as input to the first layer and output a final result as output from the last layer.

Each layer, of the neural network until the last one, allows generating of, at the output of the layer, an intermediate data block, representative of intermediate results. These intermediate data blocks are taken as input to other layers, which generate from these intermediate data blocks their own intermediate data blocks.

SUMMARY

Artificial neural networks can be implemented by integrated circuits such as microcontrollers.

During the execution of the neural network, the intermediate data are temporarily stored in a memory area, called global memory area, of an integrated circuit memory. However, some integrated circuits have a memory of limited size.

It is thus important to limit the size required for the storage of the intermediate data generated by the layers of the neural network.

In order to limit the size required for the storage of the intermediate data, a method allowing temporarily storage of the intermediate data blocks according to optimized placements in the global memory area should be provided.

Known allocation solutions do not always allow obtaining of an optimal allocation of memory. In particular, these allocation solutions do not always allow obtaining of an optimized global memory area size.

For example, a known solution consists in placing the intermediate data blocks only in free areas of the global memory area.

Such a solution can lead to excessive memory fragmentation, thus leading to wasted memory if the free areas of the memory become too small during the execution of the neural network.

Another known solution consists in a superposition allocation wherein, for each layer, the intermediate data block generated by this layer can overwrite in the global memory area at least part of the intermediate data block taken as input of this same layer.

Such a solution has the disadvantage of only operating for sequential-type neural networks. Sequential-type neural networks are neural networks for which the intermediate data block generated by each layer is taken as input only by the layer directly succeeding this last layer.

Such a solution is therefore not adapted for neural networks for which the output data of some layers are taken as input of several layers. Indeed, these output data cannot be overwritten after being used by a subsequent layer when other layers require it.

There is therefore a need to propose a method allowing reduction of the memory size necessary for storing the intermediate data blocks generated by the layers of a neural network.

According to one aspect, a method for determining, for a memory allocation, placements in a global memory area of data blocks, called intermediate data blocks, generated by each of the layers of an artificial neural network, is proposed, the method comprising: a definition of several possible placements of the intermediate data blocks of each layer in the global memory area, a development of an initial sequence of placements of the intermediate data blocks of each layer from the first layer to the last layer of the neural network, each placement of the initial sequence being selected from the several possible placements of the intermediate data block to be placed, the initial sequence allowing definition of a planned size of the global memory area, the initial sequence being defined as a candidate sequence, a memorization of the unselected placements for the intermediate data blocks of each layer, a development of at least one sequence of placements which is modified compared to the initial sequence from a given placement of the initial sequence, the development of this modified sequence comprising a modification of the given placement by a memorized unselected placement, and, if the planned size of the global memory area obtained by this modified sequence is less than the planned size of the global memory area of the candidate sequence, then this modified sequence becomes the candidate sequence, the placements of the intermediate data blocks for the memory allocation being those of the sequence of placements, called chosen sequence, defined as the candidate sequence once each modified sequence has been developed.

Some possible placements of intermediate data blocks can lead to an increase in the size of the global memory area.

Such a method allows trying of several placement sequences of intermediate data blocks in order to determine which placement sequence allows obtaining of a planned size of the global memory area, for example the narrowest possible size.

The number of sequences tested, including the initial sequence, may be greater than or equal to two.

Such a method thus allows for example to find the best placement for each intermediate data block in order to minimize the size of the global memory area.

By minimising the size of the global memory area, such a method allows the use of an integrated circuit having a small memory size. Such a method thus allows for example the use of inexpensive integrated circuits.

The size of the global memory area is dynamically defined according to the placements selected during the development of the placement sequence. In particular, when a selected placement of an intermediate data block requires an increase in the size of the global memory area, then the global memory area is increased.

It may be preferable to develop all the possible modified sequences, that is to say to try all the possible placement sequences, in order to obtain the placement sequence allowing a maximum optimization of the size of the global memory area.

Nevertheless, it is also possible to limit the number of modified sequence(s) to be developed so as to accelerate an execution of such a determination method by a processing unit. The placement sequence chosen for the memory allocation may not be the most optimized, but will still be the most optimized among the developed placement sequences.

In an advantageous embodiment, an order of priority is assigned to each possible placement for each intermediate data block, the selection of the placement of each intermediate data block for the development of the initial sequence being carried out according to the order of priority of the placement.

The assignment of an order of priority allows reducing of the number of placement sequences to be developed in order to obtain the placement sequence allowing minimization of the planned size of the global memory area.

The assignment of an order of priority allows reducing of the execution time of the method.

Preferably, the placements not selected for the initial sequence are memorized from bottom to top in a stack according to their order of priority for each intermediate data block.

This stack may have a limited size. A small stack size allows accelerating of the execution of the method.

Advantageously, each modified sequence is developed so that it maintains the same placements as those of the initial sequence until the placement associated with the same intermediate data block as the placement placed at the top of the stack. This placement of the initial sequence is replaced by the placement placed at the top of the stack which is then removed from the stack. The placements of the intermediate data blocks of the subsequent layers of the modified sequence are selected from the possible placements for these intermediate data blocks. The unselected placements are memorized in the stack.

In an advantageous embodiment, modified sequences are developed until the stack is empty.

Advantageously, for each placement memorized in the stack is associated the size of the global memory area which could have been obtained by this placement if it had been selected from the various possible placements of an intermediate data block.

Preferably, the method comprises, before each development of a modified sequence, a comparison between the size of the global memory area associated with each placement of the stack and the planned size of the global memory area obtained for the candidate sequence, then a removal in the stack of the placements associated with a size of the global memory area greater than the planned size.

This removal allows avoiding of building modified sequences which cannot be chosen as a candidate sequence. Thus, this removal allows speeding up of the determination method and to free up space in the stack if the latter has a limited size.

Preferably, the method comprises, before each development of a modified sequence, an organization of the placements of the stack associated with the same intermediate data block according to the size of the global memory area associated therewith and according to an order of execution of these placements.

This organization allows obtaining of the best placement sequence more quickly.

Advantageously, an area of the global memory area chosen for a placement of an intermediate data block is considered to be freed as soon as the placements of data blocks of all the layers taking as input the intermediate data block placed in the area have been selected.

In an advantageous embodiment, a defined placement of an intermediate data block consists in placing the intermediate data block in a free area of the global memory area.

Such a placement allows avoiding of increasing the size of the global memory area.

In an advantageous embodiment, a defined placement of an intermediate data block generated by a layer consists in superimposing this intermediate data block on an intermediate data block taken as input of this same layer.

The superposition of an intermediate data block generated by a layer on an intermediate data block taken as input of this same layer results in an at least partial overwriting of this intermediate data block taken as input of the layer. Thus, such a placement is used when the data of the data block taken as input are not reused during the execution of the neural network. Such a placement can also allow avoiding of increasing the size of the global memory area.

In an advantageous embodiment, a defined placement of an intermediate data block consists in increasing the memory size of the global memory area to insert the intermediate data block. The size of the global memory area can be increased so as to allow a placement of a complete intermediate data block in the new part of the global memory area resulting from the increase in the size of the global memory area. Alternatively, it is possible to increase the global memory area so as to allow a placement of a data block by superimposing a part of the intermediate data block on intermediate data already stored in the global memory area, these intermediate data being then overwritten, and by storing the rest of the intermediate data block in the new part of the global memory area resulting from the increase in the size of the global memory area.

According to another aspect, a method for allocating a global memory size is proposed, wherein the global memory size is chosen to be equal to the planned size obtained by the chosen sequence defined by a method for determining placements as described above, then the memory is allocated according to the determined successive placements.

According to another aspect, provision is made of an integrated circuit configured to receive a multilayer artificial neural network, and comprising:
  a memory configured to memorize intermediate data blocks generated by each of the layers of the neural network in an area, called global memory area, and
  a processing unit configured to implement a method, as described above, for determining the placements of the intermediate data blocks in the global memory area, then an allocation method as described above during an execution of the neural network.

BRIEF DESCRIPTION OF THE DRAWINGS

Other advantages and features of the invention will become apparent upon examining the detailed description of implementations and embodiments, which are in no way limiting, and the appended drawings wherein.

DETAILED DESCRIPTION OF ILLUSTRATIVE EMBODIMENTS

Figure 1:
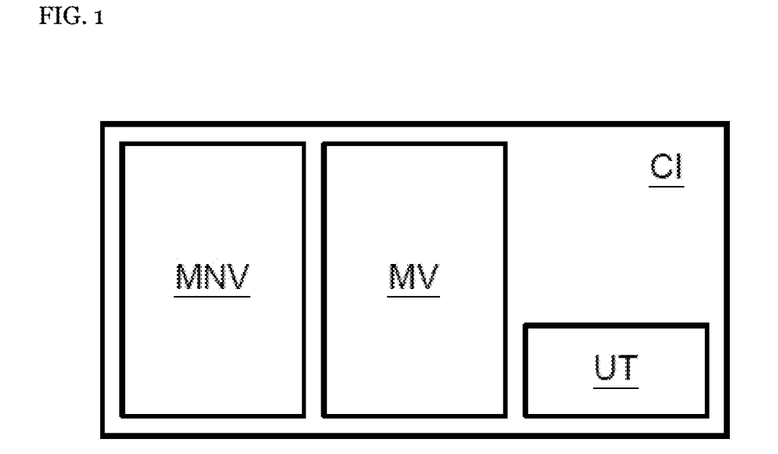
FIG. 1 illustrates an integrated circuit.

FIG. 1 shows an integrated circuit CI. This integrated circuit CI may for example be a microcontroller, a code generator or any other object which may contain an on-board or hardware software architecture.

The integrated circuit CI is configured to implement a neural network. The neural network comprises a succession of layers. Each layer, except the last layer, is configured to generate at the output of the layer an intermediate data block, from a data block received at the input of this layer. This input block received at the input may be an initial data block received at the input of the first layer or else an intermediate data block generated by an upstream layer in the succession of layers.

In particular, the data of each intermediate data block represents an intermediate result of the neural network.

A depth level is assigned to each layer of the neural network. In particular, the first layer of the succession of layers is considered to be the shallowest layer of the neural network and the last layer is considered to be the deepest layer of the network.

The neural network may or may not be a sequential neural network. In particular, the neural network can comprise some layers generating output data which are taken as input of several layers having different depth levels in the neural network.

The integrated circuit CI comprises a volatile memory MV, for example a RAM (for "Random Access Memory") memory.

The volatile memory MV is configured to be able to record an execution code of the neural network as well as a program allowing execution of the neural network.

The volatile memory MV also comprises an area, called global memory area (not shown in FIG. 1), which can be allocated for the storage of the data taken as input and the data generated at the output of each layer of the neural network.

The integrated circuit CI also comprises a non-volatile MNV memory configured to record the various parameters defining the architecture of a neural network, that is to say the configuration of its layers and of its weights.

The integrated circuit CI also comprises a processing unit UT configured to determine the size of a global memory area to be allocated in order to be able to store all the intermediate data blocks in the volatile memory MV during the execution of the neural network. For this purpose, the processing unit UT is coupled to the volatile memory MV, and is configured to determine the size of the intermediate data block associated with a layer of the neural network.

The processing unit UT comprises, for example, a microprocessor.

When executing the neural network, the layers are executed in an order defined according to the architecture of the neural network. Each layer thus generates an intermediate data block once executed. Each intermediate data block is then placed, that is to say stored, in an allocated area of the global memory area.

In order to optimize the placement of the intermediate data blocks in the global memory area so as to minimize the size of this global memory area, a method for determining the placements of the intermediate data blocks is implemented before the execution of the neural network.

The processing unit UT is configured to implement such a method for determining the placements of the intermediate data blocks.

Figure 2:
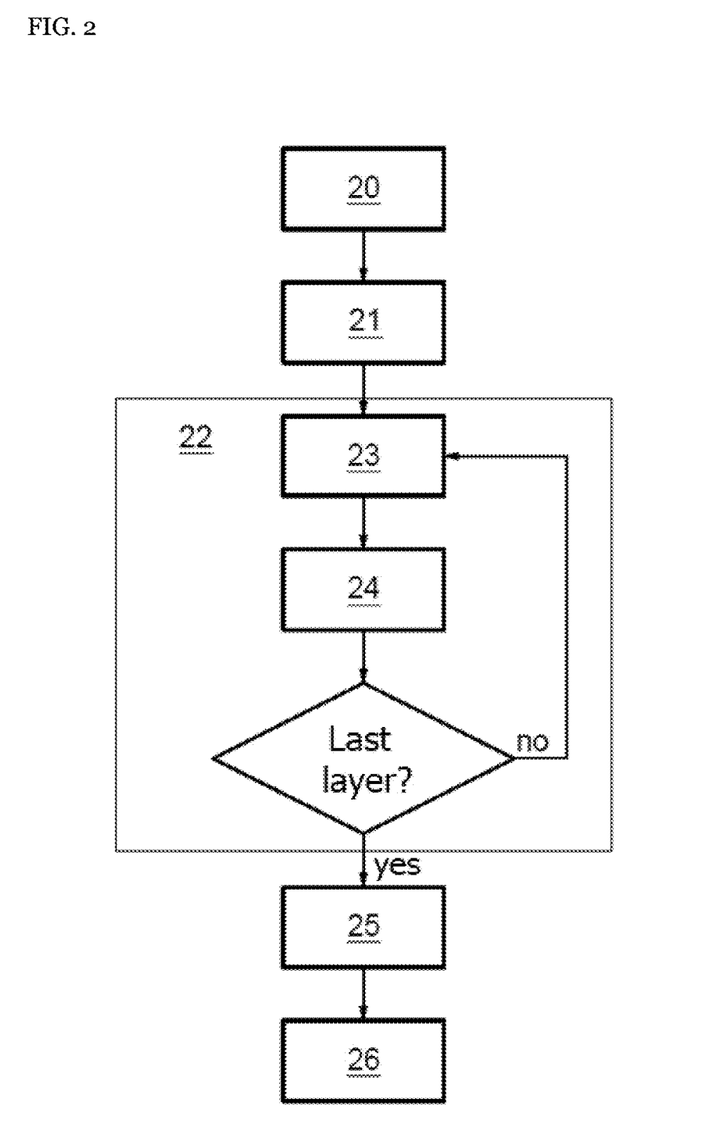
FIG. 2 illustrates a flow diagram for determining and allocating a size of a global memory area.

FIG. 2 shows a flow diagram of the various steps leading to the determination and allocation of the size of the global memory area comprising all the intermediate data blocks.

Step 20 comprises receiving the architecture of the neural network to be stored in the non-volatile memory MNV.

The processing unit UT is configured to extract the architecture, that is to say, the configuration of the layers, the operations between the layers and the weights of the neural network.

The method comprises a step 21 wherein the calculation unit determines, depending on the architecture of the neural network, which are the possible placements of the intermediate data blocks generated by each layer in the global memory area.

Some placements can lead to an increase in the size of the global memory area.

The possible placements of the intermediate data blocks are chosen from several predetermined placements depending on the configuration of the neural network, in particular of the order of execution of each layer.

Figure 3A:
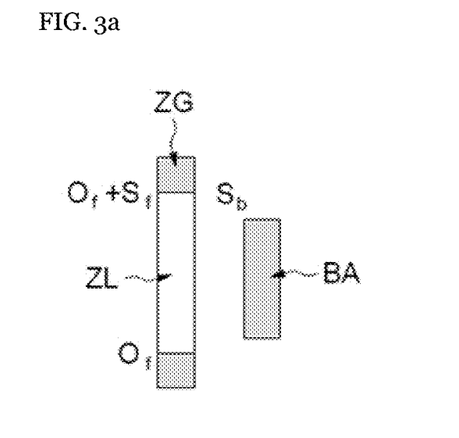
FIGS. 3a-3c illustrate placements of intermediate data blocks in the global memory area.
Figure 3B:
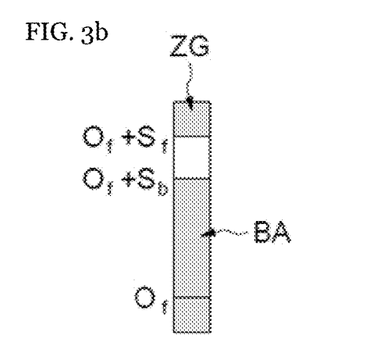
Figure 3C:
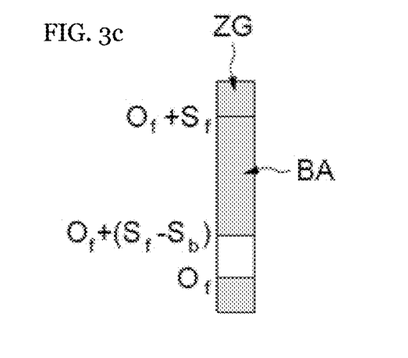

For example, the placements shown in FIGS. 3a, 3b and 3c consist in placing an intermediate data block BA in a free area ZL of the global memory area ZG. A free area ZL in the global memory area can be obtained when an area used to store an intermediate data block during the execution of the neural network can be deallocated. More particularly, an area storing an intermediate data block can be deallocated during the execution of the neural network when each layer taking as input this intermediate data block has been executed.

In FIG. 3b, the intermediate data block BA is placed in a lower part of the free area ZL, and in FIG. 3c, the intermediate data block BA is placed in an upper part of the free area ZL. These placements are hereinafter referred to as interposition placements.

Such a placement allows avoiding of increasing the size of the global memory area.

FIGS. 4a, 4b, 4c, 4d show "superposition" placements.

Figure 4A:
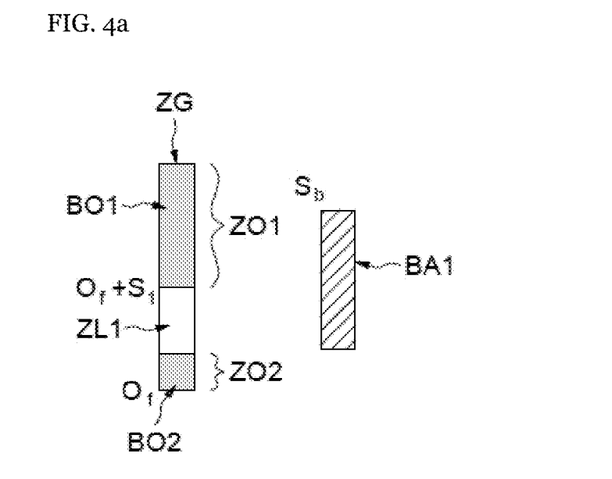
FIGS. 4a-4d illustrate superposition placements of intermediate data blocks in the global memory area.

In FIG. 4a, an attempt is made to place an intermediate data block BA1 generated at the output of a layer in a global memory area ZG having a memory area ZO1 dedicated to the storage of an intermediate data block BO1 taken at the input of this same layer.

Figure 4B:
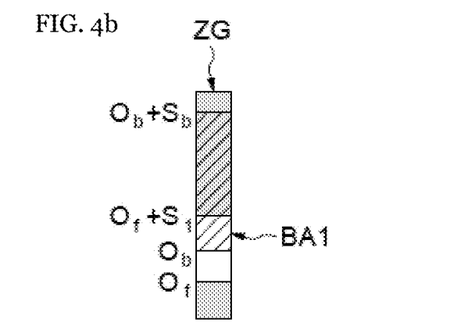

This global memory area ZG also has a free area ZIA between the block BO1 and another memory area ZO2 dedicated to the storage of an intermediate data block BO2 from another layer of the neural network. The intermediate data block BA1 has a size $s_b$. The free area ZL1 has a size of $s_1$ and extends from a height of to a height $o_f + s_1$. As the data of the intermediate data block BO1 taken as input are not reused after the calculation of the data of the intermediate data block BA1, it is possible during the execution of the neural network to place the intermediate data block BA1 on the area ZO1, by overwriting part of the intermediate data block BO1 taken as input of the layer, and on the free area ZL1, as shown in FIG. 4b. The intermediate data block BA1 then extends from a height $o_b$ up to a height $o_b + s_b$.

Figure 4C:
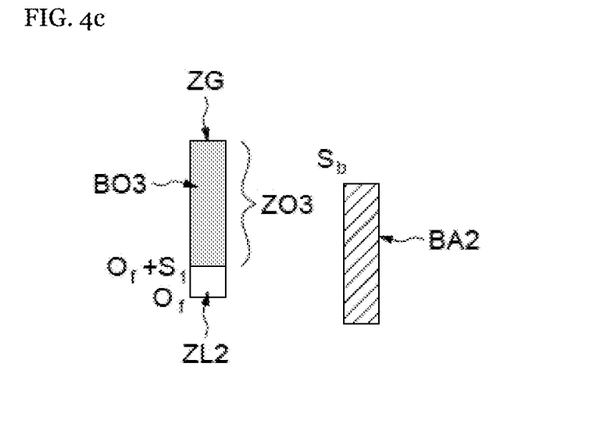

Moreover, in FIG. 4c, an attempt is made to place an intermediate data block BA2 generated at the output of a layer of the neural network in a global memory area ZG having an area ZO3 used to store an intermediate data block BO3 taken as input of this same layer. Furthermore, this global memory area ZG can also have a free area ZL2 between the area ZO3 and one end of the global memory area (here the lower end of the global memory area). The intermediate data block BA2 has a size $s_b$. The free area ZL has a size $s_1$ and extends from a height $o_f$ up to a height $o_f+s_1$.

Figure 4D:
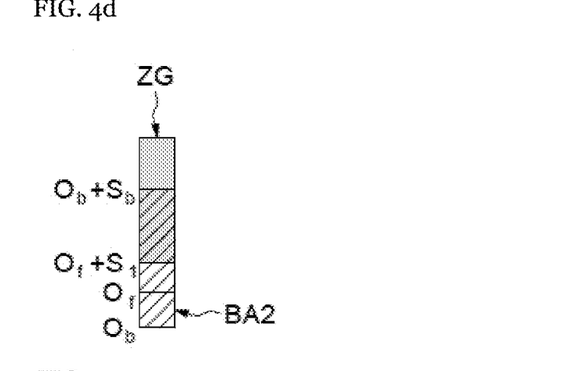

Here, during the execution of the neural network, the data of the intermediate data block BO3 taken as input are not reused after the calculation of the data of the intermediate data block BA2. One possible placement therefore consists in placing, during the execution of the neural network, the intermediate data block BA2 on the area ZO3, by overwriting part of the intermediate data block BO3 taken as input, and in the free area ZL. Nevertheless, the size of the global memory area is insufficient to be able to comprise the intermediate data block BA2. Thus, it is necessary to increase the size of the global memory area by defining a new end of the global memory area in order to be able to place the intermediate data block BA2 in the global memory area ZG, as shown in FIG. 4d. The lower end which was previously defined at a height $o_f$ is modified to be defined at a height $o_b$. The intermediate data block BA2 then extends between the height $o_b$ and the height $o_b+s_b$.

FIGS. 5a, 5b, 5c, 5d show "forced allocation" placements. For these placements, the memory size of the global memory area ZG is increased to insert the intermediate data block.

Figure 5A:
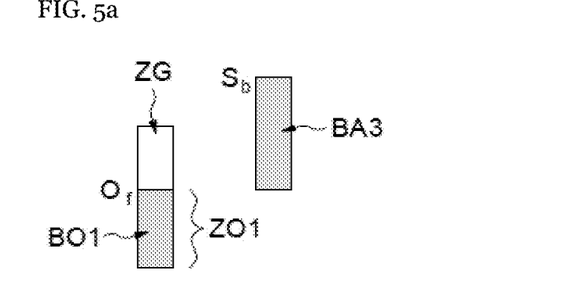
FIGS. 5a-5d illustrate forced allocation placements of intermediate data blocks in the global memory area.

In particular, in FIG. 5a, an attempt is made to place an intermediate data block BA3 generated at the output of a layer of the neural network in a global memory area ZG having at least one area ZO1 used to store an intermediate data block BO1 of another layer of the neural network. The global memory area ZG can also have a free area ZlA between the area ZO1 and an upper end of the global memory area. The intermediate data block BA3 has a size $s_b$. The free area ZL has a size smaller than $s_b$.

Here, the data of the intermediate data block BO1 taken as input of the layer cannot be overwritten. Furthermore, the free area ZL is not large enough to place the entire intermediate data block BA3. Thus, a placement consists in increasing the size of the global memory area ZG in order to be able to place the intermediate data block BA by redefining the upper end of the global memory area.

Figure 5B:
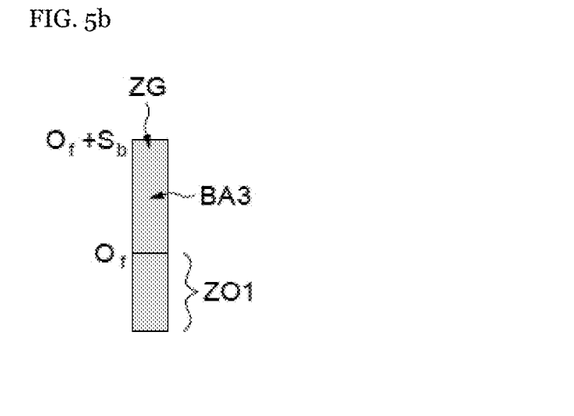

In particular, in FIG. 5b, the upper limit of the global memory area ZG is defined at the height $o_f+s_b$ so as to place the intermediate data block BA3 at the top of the global memory area, that is to say between the height $o_f$ and the height $o_f+s_b$.

Figure 5C:
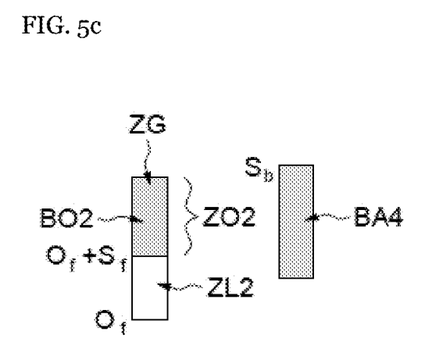
Figure 5D:
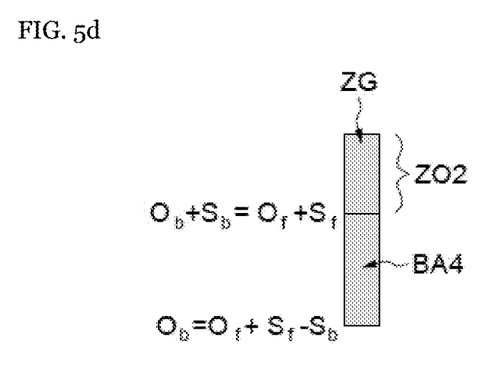

The global memory area of FIG. 5c wherein the intermediate data block BA4 must be placed differs from that of FIG. 5a in that it comprises a free area ZL1 between an intermediate data block ZO1 and a lower end of the global memory area ZG.

Thus, in FIG. 5b the lower limit of the global memory area ZG is defined at the height $o_f+s_f-s_b$ so as to place the intermediate data block $BA_4$ at the bottom of the global memory area ZG, that is to say between the height $o_f+s_f-s_b$ and the height $o_f+s_f$.

Moreover, an order of priority is advantageously established between the various possible placements of each intermediate data block. The highest order of priority is given to the placement that is arbitrarily considered to be the most optimized. For example, it may be advantageous to consider the interposition placement as the most optimized over the superposition placement and the forced allocation placement. This placement is considered to be the most optimized for a data block taken in isolation, but may not be the most optimized when the sequence of placements is considered as a whole.

The following steps of the method allow determining of a sequence of placements of intermediate data blocks allowing obtaining of the global memory area of the smallest planned size. Each placement of the placement sequence corresponds to the placement of an intermediate data block of a layer of the neural network.

The method thus comprises a development 22 of an initial sequence of placements of the intermediate data blocks generated by each of the layers of the neural network from the first layer to the penultimate layer of the neural network. In other words, an initial sequence of placements is developed by determining layer by layer the placements of the intermediate data blocks generated by each layer from the shallowest layer of the neural network to the deepest layer.

In step 23, each placement of the initial sequence is selected from the several possible placements of the intermediate data block to be placed. In particular, the selected placement is the one with the highest order of priority compared to the other possible placements of the intermediate data block to be placed.

During the development of the initial sequence, the size of the global memory area ZG is calculated and updated for each selected placement. Furthermore, the sizes of the global memory area ZG which could have been obtained if the other placements from the possible placements had been chosen are also calculated.

The initial sequence allows defining of a planned size of the global memory area. In particular, the planned size of the global memory area is the size obtained by the last selected placement.

This initial sequence is defined as a candidate sequence for a memory allocation for the storage of intermediate data blocks during the execution of the neural network.

The method also comprises a memorization 24 of the unselected placements for the intermediate data blocks of each layer. The sizes of the global memory area which could have been obtained if the other placements from the possible placements had been chosen are also memorized.

More particularly, the unselected placements are memorized in a stack PL according to their order of priority and the depth in the neural network of the layer with which they are associated. Thus, the unselected placements of the first layer of the neural network are memorized at the bottom of the stack and the placements of the last layer are memorized at the top of the stack.

Figure 6:
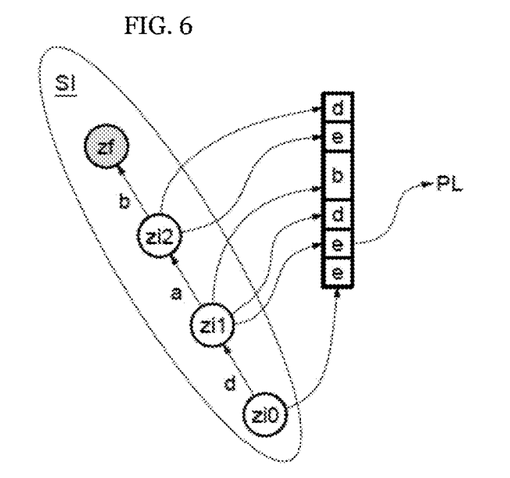
FIG. 6 illustrates development and memorization of an initial sequence comprising three placements.

An example of the development of an initial sequence SI and of memorization is shown in FIG. 6. In this example, the initial sequence SI comprises three placements. At the start of development, the global memory area has an initial size $zi_0$.

In particular, for a first intermediate data block, two placements are possible: d and e. As the placement d has a higher order of priority than the placement e, this placement d is selected for this first intermediate data block. This placement d requires a size $zi_1$ for the global memory area. The size of the memory area is therefore updated to be equal to the size $zi_1$. The placement e is then memorized in the stack PL as well as the size of the global memory area which could have been obtained by choosing this placement.

Then, the method determines the placement for the second intermediate data block. Four placements are possible for this intermediate data block: a, b, d and e. As the placement a has a higher order of priority than the placements b, d and e, the placement a is chosen for this second intermediate data block. This placement requires a size $zi_2$ for the global memory area. The placements b, d and e are then memorized according to their order of priority in the stack PL as well as the sizes of the global memory area which could have been obtained by choosing these placements.

Then, the method determines the placement for the third intermediate data block. For this intermediate data block, three placements are possible: b, d and e. As the placement b has a higher order of priority than the placements d and e, the placement b is chosen for this third intermediate data block. This placement requires a size zf for the global memory area. The placements d and e are then memorized in the stack PL as well as the sizes of the global memory area which could have been obtained by choosing these placements.

A placement having been selected for all the intermediate data blocks, the initial sequence is then complete. Thus, the size zf is designated as the planned size of the global memory area for this initial sequence of placements.

The initial sequence may not be the most optimized sequence of placements, that is to say the sequence of placements allowing the size of the global memory area to be minimized. In particular, a placement which can be chosen arbitrarily as the most optimized may not be the placement which will ultimately allow reducing of the size of the global memory area as much as possible.

Thus, as shown in FIG. 2, the method comprises a development 25 of at least one modified sequence of placements relative to the initial sequence from a given placement of the initial sequence. The development of this modified sequence comprises a modification of the given placement by an unselected placement memorized in the stack. This unselected placement and the given placement are associated with the same intermediate data block.

Preferably, the modified sequence is developed taking into account the order of the placements in the stack.

In particular, the placement at the top of the stack is the placement chosen to modify the placement of the initial sequence associated with the same intermediate data block. This placement used to modify the initial sequence is then removed from the stack.

The modified sequence is identical to the initial sequence until the placement replaced by the placement of the top of the stack. In other words, the placements of the initial sequence of data blocks associated with a shallower layer than that associated with the intermediate data blocks whose placement has been modified are maintained in the modified sequence.

Then, placements for the data blocks of the subsequent layers are selected.

Once all the layers are processed and a placement has been determined for each intermediate data block, the modified sequence is then complete.

In particular, the placements of the intermediate data blocks are selected from the possible placements for these intermediate data blocks according to the established order of priority.

As for the initial sequence, the unselected placements are memorized as well as the sizes of the global memory area which could have been obtained if these placements had been selected.

Then, the method can develop other modified sequences from the initial sequence. In particular, for each new modified sequence to be developed, the placements of the initial sequence are maintained until the placement associated with the intermediate data block with which the placement placed at the top of the stack is associated. This placement is replaced by the placement placed at the top of the stack. Then, as previously, placements are selected for the intermediate data blocks of the subsequent layers and the unselected placements are memorized as well as the sizes of the global memory area which could have been obtained if these placements had been selected.

Preferably, modified sequences are developed until the stack is empty.

Figure 7A:
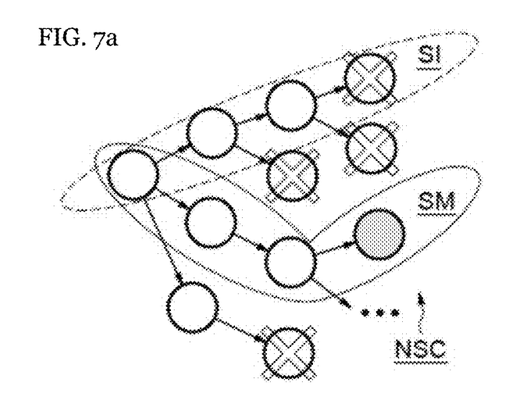
FIG. 7a illustrates several modified placement sequences developing from an initial placement sequence.

Thus, the method allows developing of several placement sequences from the initial placement sequence. By way of illustration, an example of placement sequences is shown in FIG. 7a. In this example, the placement sequence SI is the initial sequence. In particular, several modified placement sequences are developed including a modified sequence SM. This modified sequence SM allows obtaining of a reduced global memory area size compared to the initial sequence SI. This modified sequence therefore becomes the new candidate sequence NSC.

The development of several modified sequences allows testing of different possible placements in order to determine an optimal sequence of placements, that is to say the sequence of placements allowing minimization of the planned size of the global memory area.

In particular, each modified sequence can be defined as a new candidate sequence replacing the previous candidate sequence if the planned size of the global memory area obtained by this modified sequence is less than the planned size of the global memory area of the previous candidate sequence.

The method therefore comprises, for each complete modified sequence, a comparison between the planned size of the global memory area obtained by this complete modified sequence and that obtained by the candidate sequence. If the planned size of the global memory area obtained by this complete modified sequence is less than that defined by the candidate sequence, the complete modified sequence becomes the new candidate sequence.

Thus, the sequence of placements which is the candidate sequence when the stack becomes empty is the one selected for an allocation of the intermediate data blocks during the execution of the neural network. This candidate sequence is chosen, in step 26, as the most optimized sequence of placements.

Figure 7B:
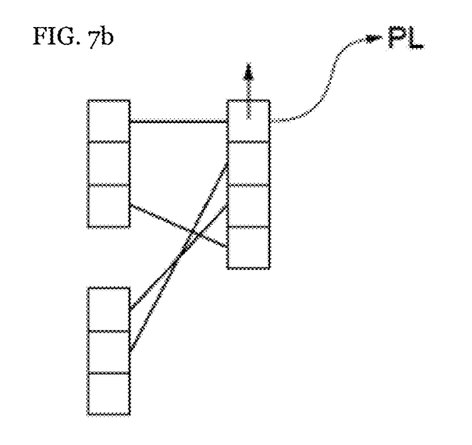
FIG. 7b illustrates modification of a stack prior to developing a modified sequence.

Preferably, as shown in FIG. 7b, before developing a modified sequence, the placements of the stack implying an increase in the size of the global memory area to a size greater than the planned size of the global memory area obtained with the candidate sequence are removed from the queue so as to avoid developing modified sequences from these placements. This removal thus allows speeding up of the execution of the method.

Furthermore, as shown in FIG. 7b, preferably, before developing a modified sequence, the placements of the stack associated with the same intermediate data block are arranged according to the sizes of the global memory area which would have been obtained if these placements had been selected previously. In particular, the placement allowing obtaining of the size of the smallest global memory area relative to the other placements associated with the same intermediate data block is placed in the stack above these other placements.

Other arrangements of the stack are possible. In particular, it is possible to arrange the placements in the stack by taking into account the proximity of this placement relative to the execution of the last layer of the neural network. Such an arrangement allows obtaining of a faster execution of the method.

It is also possible to arrange, as described previously, the placements according to the sizes of the global memory area that would have been obtained, and also by taking into account the proximity of the placement relative to the execution of the last layer of the neural network in the event of an equal global memory size between at least two placements of the stack.

It is also possible to limit the size of the stack in order to accelerate the method. The smaller the stack size, the greater the risk that the most optimized placement sequence will not be found. Thus, preferably, the size of the stack will be limited to a number of placements comprised between 1 and 100, more particularly between 1 and 50, preferably between 1 and 30.

Once the sequence of placements considered to be the most optimized is determined, the neural network can be executed.

At the start of the execution of the neural network, the processing unit UT is configured to allocate the global memory area in the volatile memory MV, the size of this global memory area being equal to the planned size obtained by the sequence of placements considered to be the most optimized.

Once the global memory area has been allocated, the processing unit UT is configured to calculate the absolute addresses of each placement of the intermediate data blocks of the sequence of placements considered to be the most optimized, then to place the intermediate data blocks in accordance with these placements.

"Absolute address" means the address of the location of the intermediate data block selected in the global memory area intended to store the intermediate data blocks of the neural network.

The method for determining placements of intermediate data blocks allows finding of the best placement for each intermediate data block to minimize the size of the global memory area.

By minimising the size of the global memory area, the method for determining placements allows the use of an integrated circuit having a small memory size. Such a method therefore allows the use of inexpensive integrated circuits.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for determining placements, for a memory allocation in a global memory area, of intermediate data blocks generated by layers of an artificial neural network, the method comprising:
    defining several possible placements of the intermediate data blocks of each layer in the global memory area;
    assigning an order of priority to each possible placement for each intermediate data block:
    developing an initial sequence of placements of the intermediate data blocks of each layer from a first layer to a last layer of the neural network, each placement of the initial sequence being selected from the several possible placements of the intermediate data block to be placed, the initial sequence allowing definition of a planned size of the global memory area, the initial sequence being set as a candidate sequence;
    memorizing, in a stack, unselected placements for the intermediate data blocks of each layer according to the order of priority of the intermediate data blocks and a depth in the artificial neural network of the respective layer with which each intermediate data block is associated;
    developing at least one sequence of placements that is modified compared to the initial sequence from a given placement of the initial sequence, the developing comprising modifying the given placement by a memorized unselected placement;
    in accordance with the planned size of the global memory area obtained by the modified sequence being less than the planned size of the global memory area of the candidate sequence, setting the modified sequence to be the candidate sequence; and
    using the sequence of placements, set as the candidate sequence once each modified sequence has been developed, as the placements of the intermediate data blocks for the memory allocation.

2. The method according to claim 1, wherein the selection of the placement of each intermediate data block for the developing the initial sequence is carried out according to the order of priority of the placement.

3. The method according to claim 2, wherein the memorizing the unselected placements is performed from bottom to top in the stack.

4. The method according to claim 3, further comprising:
    developing each modified sequence so that it maintains the same placements as those of the initial sequence until the placement associated with the same intermediate data block as the placement placed at the top of the stack, the placement of a main sequence being replaced by the placement placed at the top of the stack which is then removed from the stack; and
    selecting the placements of the intermediate data blocks of subsequent layers of the modified sequence from the possible placements for these intermediate data blocks, the unselected placements being memorized in the stack.

5. The method according to claim 4, further comprising developing the modified sequences until the stack is empty.

6. The method according to claim 4, wherein each placement memorized in the stack is associated with a size of the global memory area that could have been obtained by the placement had it been selected from the possible placements of an intermediate data block.

7. The method according to claim 6, further comprising:
    before each developing of the modified sequence, comparing between the size of the global memory area associated with each placement of the stack and the planned size of the global memory area obtained for the candidate sequence; and
    removing from the stack the placements associated with a size of the global memory area greater than the planned size.

8. The method according to claim 6, further comprising, before each developing of the modified sequence, organizing the placements of the stack associated with the same intermediate data block according to the size of the global memory area associated therewith and according to an order of execution of these placements.

9. The method according to claim 3 wherein the stack has a limited size.

10. The method according to claim 1, wherein an area of the global memory area chosen for a placement of an intermediate data block is considered to be freed as soon as the placements of data blocks of all the layers taking as input the intermediate data block placed in the area have been selected.

11. The method according to claim 10, wherein a defined placement of an intermediate data block comprises placing the intermediate data block in a free area of the global memory area.

12. The method according to claim 1, wherein a defined placement of an intermediate data block generated by a layer comprises superimposing the intermediate data block on an intermediate data block taken as input of the same layer.

13. The method according to claim 1, wherein a defined placement of an intermediate data block comprises increasing a memory size of the global memory area to insert the intermediate data block.

14. A method for allocating a global memory size, the method comprising:
defining several possible placements of intermediate data blocks, generated by layers of an artificial neural network, in a global memory area;
assigning an order of priority to each possible placement for each intermediate data block;
developing an initial sequence of placements of the intermediate data blocks of each layer from a first layer to a last layer of the neural network, each placement of the initial sequence being selected from the several possible placements of the intermediate data block to be placed, the initial sequence allowing definition of a planned size of the global memory area, the initial sequence being set as a candidate sequence;
memorizing, in a stack, unselected placements for the intermediate data blocks of each layer according to the order of priority of the intermediate data blocks and a depth in the artificial neural network of the respective layer with which each intermediate data block is associated;
developing at least one sequence of placements that is modified compared to the initial sequence from a given placement of the initial sequence, the developing comprising modifying the given placement by a memorized unselected placement;
in accordance with the planned size of the global memory area obtained by the modified sequence being less than the planned size of the global memory area of the candidate sequence, setting the modified sequence to be the candidate sequence;
using the sequence of placements, set as the candidate sequence once each modified sequence has been developed, as the placements of the intermediate data blocks for the memory allocations;
selecting the global memory size to be equal to the planned size obtained by the candidate sequence; and
allocating the memory according to successive determined placements.

15. The method according to claim 14, wherein the selection of the placement of each intermediate data block for the developing the initial sequence is carried out according to the order of priority of the placement.

16. The method according to claim 15, wherein the memorizing the unselected placements is performed from bottom to top in the stack.

17. The method according to claim 16, further comprising:
developing each modified sequence so that it maintains the same placements as those of the initial sequence until the placement associated with the same intermediate data block as the placement placed at the top of the stack, the placement of a main sequence being replaced by the placement placed at the top of the stack which is then removed from the stack; and
selecting the placements of the intermediate data blocks of subsequent layers of the modified sequence from the possible placements for these intermediate data blocks, the unselected placements being memorized in the stack.

18. An integrated circuit configured to receive a multi-layer artificial neural network, the integrated circuit comprising:
a memory configured to memorize intermediate data blocks generated by each of a plurality of layers of the neural network in a global memory area; and
a processing unit coupled to the memory, the processing unit configured to:
define several possible placements of the intermediate data blocks of each layer in the global memory area;
assign an order of priority to each possible placement for each intermediate data block:
develop an initial sequence of placements of the intermediate data blocks of each layer from a first layer to a last layer of the neural network, each placement of the initial sequence being selected from the several possible placements of the intermediate data block to be placed, the initial sequence allowing definition of a planned size of the global memory area, the initial sequence being set as a candidate sequence;
memorize, in a stack, unselected placements for the intermediate data blocks of each layer according to the order of priority of the intermediate data blocks and a depth in the artificial neural network of the respective layer with which each intermediate data block is associated;
develop at least one sequence of placements that is modified compared to the initial sequence from a given placement of the initial sequence, the developing comprising modifying the given placement by a memorized unselected placement;
in accordance with the planned size of the global memory area obtained by the modified sequence being less than the planned size of the global memory area of the candidate sequence, set the modified sequence to be the candidate sequence;
use the sequence of placements, set as the candidate sequence once each modified sequence has been developed, as the placements of the intermediate data blocks for in the global memory area; and
during an execution of the neural network:
select a global memory size to be equal to the planned size obtained by the candidate sequence; and
allocate the memory according to successive determined placements.

19. The integrated circuit according to claim 18, wherein the selection of the placement of each intermediate data block for the developing the initial sequence is carried out according to the order of priority of the placement.

20. The integrated circuit according to claim 19, wherein the memory is further configured to memorize the unselected placements from bottom to top in the stack.

21. The integrated circuit according to claim 20, wherein the processing unit is further configured to:
develop each modified sequence so that it maintains the same placements as those of the initial sequence until the placement associated with the same intermediate data block as the placement placed at the top of the stack, the placement of a main sequence being replaced by the placement placed at the top of the stack which is then removed from the stack; and select the placements of the intermediate data blocks of subsequent layers of the modified sequence from the possible placements for these intermediate data blocks, the unselected placements being memorized in the stack.

\* \* \* \* \*

UNITED STATES PATENT AND TRADEMARK OFFICE
CERTIFICATE OF CORRECTION

PATENT NO. : 11,609,851 B2
APPLICATION NO. : 17/229161
DATED : March 21, 2023
INVENTOR(S) : Laurent Folliot It is certified that error appears in the above-identified patent and that said Letters Patent is hereby corrected as shown below:

In the Claims

Claim 1, Column 11, Line 57; delete "block:" and insert --block;--.

Signed and Sealed this
Eighteenth Day of April, 2023

Katherine Kelly Vidal
*Director of the United States Patent and Trademark Office*